United States Patent
Chen et al.

(10) Patent No.: US 10,692,381 B2
(45) Date of Patent: Jun. 23, 2020

(54) PARKING ASSISTANCE APPARATUS FOR A MOTOR VEHICLE

(71) Applicant: VALEO Schalter und Sensoren GmbH, Bietigheim-Bissingen (DE)

(72) Inventors: Jie Chen, Bietigheim-Bissingen (DE); Steve Kreyer, Bietigheim-Bissingen (DE); Ralf Schneider, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 136 days.

(21) Appl. No.: 15/310,618

(22) PCT Filed: Apr. 17, 2015

(86) PCT No.: PCT/EP2015/058382
§ 371 (c)(1),
(2) Date: Nov. 11, 2016

(87) PCT Pub. No.: WO2015/176884
PCT Pub. Date: Nov. 26, 2015

(65) Prior Publication Data
US 2017/0084179 A1 Mar. 23, 2017

(30) Foreign Application Priority Data
May 23, 2014 (DE) .......... 10 2014 107 305

(51) Int. Cl.
*G08G 1/16* (2006.01)
*G01S 7/00* (2006.01)
(Continued)

(52) U.S. Cl.
CPC .......... *G08G 1/168* (2013.01); *B62D 15/025* (2013.01); *B62D 15/0265* (2013.01);
(Continued)

(58) Field of Classification Search
CPC .......... B62D 15/025; B62D 15/0265; B62D 15/0285; G01S 15/87; G01S 15/931;
(Continued)

(56) References Cited

U.S. PATENT DOCUMENTS 4,634,110 A * 1/1987 Julich ............... G06F 11/22
700/2
4,701,854 A * 10/1987 Matsuda ............. B60T 8/885
303/113.1

(Continued)

FOREIGN PATENT DOCUMENTS

DE 10 2006 056 838 A1 6/2008
DE 10 2009 040 295 A1 3/2011
(Continued)

OTHER PUBLICATIONS

International Search Report issued in PCT/EP2015/058382, dated Nov. 9, 2015 (3 pages).
(Continued)

Primary Examiner — Angelina Shudy
(74) Attorney, Agent, or Firm — Osha Liang LLP (57) ABSTRACT

The invention relates to a parking assistance apparatus (12) for a motor vehicle (10). The invention is based on the object of providing reliably working parking assistance that can involve computational-intensive processing of sensor signals. To this end, at least one sensor (20) for producing a sensor signal (S) that is dependent on a relative position (D) of a vehicle-external object (22) is connected to a first controller (14) that is designed to take each sensor signal (S) as a basis for producing position data (P) that describe the relative position (D) and to transmit said position data via a communication link (18) of the motor vehicle (10). A second controller (16) is designed to receive the position data (P) via the communication link (18) and, during a parking manoeuvre of the motor vehicle (10), to take the position data (P) as
(Continued)

a basis for outputting a control signal (C) to an actuator device (26) of the motor vehicle (10).

14 Claims, 5 Drawing Sheets

(51) Int. Cl.
| | |
|---|---|
| B62D 15/02 | (2006.01) |
| G01S 15/87 | (2006.01) |
| G01S 15/931 | (2020.01) |
| G01S 7/52 | (2006.01) |
| G05D 1/02 | (2020.01) |

(52) U.S. Cl.
CPC .......... *B62D 15/0285* (2013.01); *G01S 7/003* (2013.01); *G01S 7/52* (2013.01); *G01S 15/87* (2013.01); *G01S 15/931* (2013.01); *G05D 1/021* (2013.01); *G01S 2015/932* (2013.01)

(58) Field of Classification Search
CPC ...... G01S 2015/932; G01S 7/003; G01S 7/52; G05D 1/021; G08G 1/168
USPC ............................................. 701/23
See application file for complete search history.

(56) References Cited

U.S. PATENT DOCUMENTS

| | | | | |
|---|---|---|---|---|
| 4,809,177 | A * | 2/1989 | Windle | B60R 16/0315 180/170 |
| 5,159,557 | A * | 10/1992 | Ogawa | G01S 11/12 180/169 |
| 5,504,679 | A * | 4/1996 | Wada | B62D 5/0493 701/41 |
| 5,812,757 | A * | 9/1998 | Okamoto | G06F 11/1658 714/11 |
| 5,890,003 | A * | 3/1999 | Cutts, Jr. | G06F 9/52 710/263 |
| 6,240,526 | B1 * | 5/2001 | Petivan | G06F 11/165 714/11 |
| 6,263,452 | B1 * | 7/2001 | Jewett | G06F 1/12 714/11 |
| 6,308,127 | B1 * | 10/2001 | Tsunehara | B60K 28/16 303/140 |
| 6,438,491 | B1 * | 8/2002 | Farmer | B60W 30/16 340/435 |
| 9,302,656 | B2 * | 4/2016 | Koth | B60T 13/74 |
| 9,916,703 | B2 * | 3/2018 | Levinson | G07C 5/0808 |
| 2001/0018720 | A1 | 8/2001 | Weigl et al. | |
| 2002/0170685 | A1 * | 11/2002 | Weik, III | E05F 1/006 160/133 |
| 2003/0034883 | A1 | 2/2003 | Sato et al. | |
| 2003/0188221 | A1 * | 10/2003 | Rasmussen | G05B 9/03 714/11 |
| 2004/0186979 | A1 * | 9/2004 | Janke | G06F 9/30189 712/1 |
| 2005/0085960 | A1 * | 4/2005 | Lumbis | B60T 8/1705 701/19 |
| 2006/0273927 | A1 | 12/2006 | Sato | |
| 2007/0216528 | A1 * | 9/2007 | Sanma | G08G 1/161 340/506 |
| 2008/0232198 | A1 * | 9/2008 | Hayasaka | G01S 7/52004 367/99 |
| 2010/0007476 | A1 * | 1/2010 | Klotz | G01S 13/931 340/425.5 |
| 2010/0259420 | A1 | 10/2010 | Von Reyher et al. | |
| 2012/0139716 | A1 | 6/2012 | Nagamine et al. | |
| 2013/0211639 | A1 | 8/2013 | Koyama et al. | |
| 2014/0214283 | A1 * | 7/2014 | Maurer | H02P 29/00 701/49 |
| 2014/0229064 | A1 * | 8/2014 | Arnold | B60W 50/023 701/41 |
| 2015/0006027 | A1 * | 1/2015 | Maurer | B60S 9/02 701/36 |
| 2016/0020863 | A1 * | 1/2016 | Kim | G07C 5/006 701/32.7 |
| 2016/0042238 | A1 * | 2/2016 | Lynam | B60Q 9/005 701/45 |
| 2016/0178741 | A1 * | 6/2016 | Ludlow | G01S 7/003 342/28 |
| 2016/0203377 | A1 * | 7/2016 | Irie | G08G 1/168 348/118 |
| 2016/0212307 | A1 * | 7/2016 | Park | H04N 5/2353 |
| 2016/0223645 | A1 * | 8/2016 | Kim | G01S 7/023 |
| 2017/0082731 | A1 * | 3/2017 | Herbel | G01S 7/003 |
| 2017/0124781 | A1 * | 5/2017 | Douillard | B60Q 1/26 |
| 2017/0132893 | A1 * | 5/2017 | Grenn | G08B 21/02 |
| 2017/0285134 | A1 * | 10/2017 | Stokes | G01S 7/003 |
| 2019/0087668 | A1 * | 3/2019 | Kim | G08G 1/0967 |
| 2019/0375425 | A1 * | 12/2019 | Harrison | G01S 7/003 |

FOREIGN PATENT DOCUMENTS

| | | |
|---|---|---|
| DE | 10 2012 014991 A1 | 2/2013 |
| DE | 10 2011 084366 A1 | 4/2013 |
| EP | 1 293 381 A2 | 3/2003 |
| JP | 2006-246155 A | 9/2006 |
| JP | 2008-132938 A | 6/2008 |
| JP | 2012-60207 A | 3/2012 |
| WO | 2012-059973 A1 | 5/2012 |

OTHER PUBLICATIONS

Written Opinion of the International Searching Authority issued in PCT/EP2015/058382, dated Nov. 9, 2015 (6 pages).
German Search Report issued in DE 10 2014 107 305.3 dated Feb. 2, 2015 (8 pages).
Office Action issued in corresponding European Patent Application No. 15718195.9, dated Dec. 4, 2017 (6 pages).

* cited by examiner

PARKING ASSISTANCE APPARATUS FOR A MOTOR VEHICLE

The invention relates to a parking assistance apparatus for a motor vehicle, in which at least one sensor is used to produce a sensor signal that is dependent on a relative position of a vehicle-external object, and a controller takes the relative position as a basis for controlling an actuator device. The actuator device is used to inform the driver or to drive the motor vehicle. By way of example, a warning tone is output when the vehicle-external object comes within a predetermined minimum distance. The invention also includes a motor vehicle having the parking assistance apparatus according to the invention and a method for operating the parking assistance apparatus.

Parking assistance apparatuses known from the prior art normally have the described at least one sensor, for example an ultrasonic sensor, and the described controller, which controls the actuator for informing the driver or driving the motor vehicle. As the number of sensors increases and the complexity of the measurement signals therefrom increases, the problem can arise that the processor power of such a controller is not sufficient for processing the sensor signals and at the same time controlling the actuator, particularly if the intention is to provide not just simple distance warning but rather complete automatic parking or parking space exit assistance, for example.

Within the context of the actuation of personal protection means, for example an air bag, DE 10 2006 056 838 A1 discloses a controller that receives sensor signals from an ambient camera, on the one hand, and a sensor box, on the other. In order to process the complex sensor signals, the controller has two processors, one for processing the image data from the camera and the other for the remaining computations. Wiring for the transmission of the complex camera data is kept at a low level by virtue of the camera being mounted directly on the housing of the controller.

The invention is based on the object of providing reliably working parking assistance that can involve computation-intensive processing of sensor signals.

The object is achieved by the subjects of the independent patent claims. Advantageous developments of the invention result from the features of the dependent patent claims.

In the manner described, the parking assistance apparatus according to the invention for a motor vehicle has at least one sensor that is designed to produce a sensor signal that is dependent on a relative position of a vehicle-external object. By way of example, the object may be a different vehicle or another obstacle. In the case of the parking assistance apparatus according to the invention, the at least one sensor is connected to a first controller that is designed to receive from the at least one sensor the respective sensor signal thereof and, on the whole, to take each sensor signal as the basis for producing position data that describe the relative position of the vehicle-external object. The first controller is furthermore designed to transmit these position data via a communication link of the motor vehicle. Specifically, the parking assistance apparatus according to the invention now furthermore has a second controller that is designed to receive the position data via the communication link and, during a parking manoeuvre of the motor vehicle, to take the position data as a basis for producing a control signal for controlling an actuator device of the motor vehicle and to output said control signal to the actuator device.

In other words, the invention thus provides a parking assistance apparatus or a parking assistance system in which components, namely the at least one sensor, the first controller and the second controller, can be placed in a distributed arrangement in the motor vehicle and in which the processor power required for processing the sensor data, on the one hand, and for producing the control signal for the actuator device, on the other, is split over two controllers. This split advantageously allows a reduction in the utilization level of the controllers, and secondly, in the event of a fault in one of the controllers, there is also the option of providing redundancy by means of which the functions of the failed controller can be taken on by the other controller.

Within the context of the invention, a controller is intended to be understood to mean particularly a build-in unit having a housing of its own that particularly screens the processor unit of the controller to the exclusion of dust and/or to the exclusion of spray. The at least one sensor may in each case particularly be an ultrasonic sensor or a radar sensor. Preferably, at least four sensors are provided, for example four, six, eight or twelve sensors. A sensor signal may be an analogue signal or a digital signal, that is to say raw sensor data. The position data can indicate e.g. a distance from the vehicle-external object and also distances from multiple vehicle-external objects or, by way of example, may be a digital map of the vehicle surroundings in which the vehicle-external object or multiple vehicle-external objects are recorded or mapped.

The provision of two controllers for parking assistance is not self-evident insofar as the control signal for the actuator device also needs to fit the currently measured relative position of the vehicle-external object. To this end, an advantageous development of the parking assistance apparatus provides for the first controller to be designed to also transmit, for each relative position, a time stamp to the first controller via the communication link. The time stamp indicates the time of capture of the relative position. In the second controller, it is then possible to ascertain how much time has elapsed since the relative position was measured. Additionally, the advantage arises that a series of successive measurements of relative positions, for example, can be used, together with the time stamp, in the second controller to also ascertain a speed on the basis of the position data, and this allows an extrapolation.

It is quite particularly advantageous if the second controller is designed to itself receive a sensor signal directly from at least one further sensor connected directly to the second controller and to produce further position data therefrom for producing the control signal. This now allows the position of the vehicle-external object to be estimated particularly accurately on the basis of both the position data received via the communication link and the further position data generated by the second controller itself. If the respective time stamp is also transmitted by the first controller in this case, then the position data and the further position data can also be combined in a time-synchronous manner. In addition or as an alternative to the at least one further sensor, there may also be provision for the second controller to be designed to use operating data of the motor vehicle, for example a rolling speed of at least one wheel of the motor vehicle and/or a GPS (global positioning system) position, to ascertain motion data of a proper motion of the motor vehicle. The motion data preferably comprise odometry data. This embodiment has the advantage that, between the times of measurement of the relative position, the proper motion of the motor vehicle can be used to ascertain a change in the relative position. In this case too, it is particularly advantageous to take into consideration a time stamp for the times of capture of the relative positions.

It is particularly advantageous if the case in which a system clock of the first controller and a system clock of the second controller do not operate in sync, and/or in which transmission of the position data between the controllers likewise requires time, is also taken into consideration. To this end, a particularly preferred embodiment of the invention provides for the parking assistance apparatus to be provided with a synchronization device that is designed to ascertain a time offset between the system clock of the first controller and the system clock of the second controller. Additionally or alternatively, the synchronization device may be designed to ascertain a transmission period for the transmission of the position data via the communication link. By way of example, a suitable synchronization device can be produced via a program module in one of the controllers or by program modules in both controllers. Particularly preferably, the first and/or the second controller has a respective interrupt routine that is designed to ascertain the time offset and/or the transmission period. This results in the advantage that the ascertainment of the time offset and/or of the transmission period cannot be delayed and hence distorted by another operating program of the controller.

In order to tune the first and second controllers to one another for ascertaining the time offset and/or the transmission period, it has been found to be particularly advantageous if the communication link is used to communicate in accordance with the precision time protocol, PTP. This advantageously allows determination of a time difference between the system clocks of the two controllers of up to one microsecond and less.

A further advantage arises if the first and second controllers have communication modules of the same design for providing the communication link. In other words, the hardware equipment of the controllers is the same for both controllers, at least in respect of the communication link, that is to say the integrated circuits used and/or the interconnection thereof, for example. This results in the particular advantage that one of the controllers can estimate the processing period of the communication data in the other controller by measuring its own processing period. Given communication modules of the same design, it can be assumed that the other controller also requires the same processing time.

Quite particularly preferably, the communication link comprises a communication bus of the motor vehicle, particularly a CAN (controller area network) bus and/or a FlexRay bus. This results in the advantage that the position data are transmitted in deterministically predeterminable transmission cycles. Particularly the CAN bus provides no synchronization mechanisms for the connected controllers in this case, however. In this regard, however, in a quite particularly preferred embodiment of the invention, there is provision for the first and second controllers to use the CAN bus to communicate in accordance with the PTP for the described synchronization. The PTP is actually provided for a packet-oriented communication network, such as Ethernet, for example. According to the invention, the PTP is now used in conjunction with bus communication via a CAN bus.

According to one embodiment of the invention, the second controller is designed to use the communication link to transmit at least one control command for initiating a measurement of the relative position to the first controller. The second controller can then purposefully launch or initiate a fresh measurement of the relative position if this is necessary for controlling the actuator device. Preferably, a time stamp that indicates the desired measurement time is also transmitted together with the initiation command in this case.

With reference to the actuator device used, the parking assistance apparatus according to the invention provides a multiplicity of embodiments. The actuator device can comprise a tone generator for producing a signal tone, so that the second controller can take an object distance of the vehicle-external object, for example, as a basis for producing different signal tones that differ in frequency and/or a pause length. The actuator device may also have a display device for presenting an object distance of the vehicle-external object, that is to say a bar graph, for example. The actuator device may also be actively designed such that it comprises a steering device that is used to perform semi-automatic parking and/or parking space exit for the motor vehicle by virtue of the driver, admittedly, having to perform longitudinal guidance (acceleration and braking), but transverse guidance (steering) being undertaken by the steering device. The actuator device may also comprise a brake controller for emergency braking when there is a risk of collision. The actuator device can also comprise a parking space identifier and/or a parking space surveyor. A further embodiment provides for the actuator device to comprise a control device for performing an autonomous parking manoeuvre in which the user of the motor vehicle can thus also remain outside the motor vehicle while said vehicle automatically parks or leaves a parking space.

Accordingly, the invention also covers a motor vehicle that has at least one parking assistance apparatus according to an embodiment of the parking assistance apparatus according to the invention. The motor vehicle according to the invention has the advantage that the at least one parking assistance apparatus may be placed in a respective distributed arrangement in the motor vehicle and the respective processor power of two controllers can be available for providing the functionality of parking assistance. This allows firstly redundancy and secondly increased processor power to be provided.

The invention also includes a method that arises for the operation of the parking assistance apparatus according to the invention. According to the method, a parking manoeuvre in which the motor vehicle is parked or taken out of a parking space involves the at least one sensor of the parking assistance apparatus producing a respective sensor signal that is dependent on a relative position of a vehicle-external object, and the first controller of the parking assistance apparatus receiving or accepting from the at least one sensor the respective sensor signal thereof and taking each sensor signal as a basis for producing position data and outputting the position data via a communication link of the motor vehicle. The position data are the described data for describing the relative position. The second controller of the parking assistance apparatus receives the position data via the communication link and takes the position data as the basis for producing a control signal for controlling the actuator device of the motor vehicle. This control signal is output to the actuator device. The method according to the invention has the advantage that the functionality of parking assistance can now be produced with more than one controller, so that this means that redundancy and/or the combined processor power of two controllers can be used.

An advantageous development of the method provides that the first controller and the second controller have synchronization data interchanged between them via the communication link once or repeatedly or periodically, and the synchronization data are used to ascertain a time offset between system clocks of the controllers and/or to ascertain a transmission period for the transmission of position data. As a result of the time offset and/or the transmission period being taken into consideration, the second controller can, when controlling the actuator device, advantageously take into consideration whether a relative position described by the position data is still current or whether a proper motion of the motor vehicle or of the vehicle-external object means that another relative position needs to be taken as a basis. The periodic transmission of synchronization data has the particular advantage that it is also possible for a drift in the system clocks to be taken into consideration or even compensated for.

The transmission period can be ascertained by measuring what is known as a round trip time. To this end, one of the controllers transmits a request message and measures the transmission time for this request message. The other controller uses the communication link to receive this request message and returns a response message. When the returned response message is received, the reception time can then be ascertained, and comparison of the transmission times with the reception time allows the period for a transmission to and fro to be ascertained. The transmission period is then estimated as half the round trip time. In this embodiment, the described synchronization data are thus provided by the request message and the response message.

In order to ascertain the time offset, the following method is preferably provided. One of the controllers, particularly the first controller, transmits a synchronization message and in so doing measures the transmission time. A measurement message with the transmission time is then likewise transmitted. The other of the controllers, that is to say particularly the second controller, receives the synchronization message and in so doing measures the reception time. The measurement message is then also received. In this case, the synchronization message and the measurement message form synchronization data. The time offset between the system clocks of the controllers is then ascertained by taking into consideration the transmission time, the reception time and the transmission period. The transmission period is preferably estimated in the manner described above in this case.

The ascertained time offset can be taken as a basis for synchronizing the system clocks, for example, by virtue of one of the synchronization clocks being set to the same time as the other system clock by means of the time offset.

Preferably, however, there is provision for the first controller to transmit at least one time stamp, which indicates a time of capture of the relative position of the vehicle-external object in the manner described, to the second controller. The second controller then computes from each received time stamp, on the basis of the time offset and/or the transmission period, a virtual time stamp that is then preferably associated with the relative position. This results in the advantage that the system clocks of the controllers do not need to be altered, which ensures stable operation of the controllers.

An exemplary embodiment of the invention is described below. In this context.

The exemplary embodiment explained below is a preferred embodiment of the invention. In the case of the exemplary embodiment, however, the described components of the embodiment are each individual features of the invention that can be considered independently of one another and that each also develop the invention independently of one another and hence can also be regarded as part of the invention individually or in a combination other than that shown. Furthermore, the described embodiment is also augmentable by further features from the features of the invention that have already been described.

Figure 1:
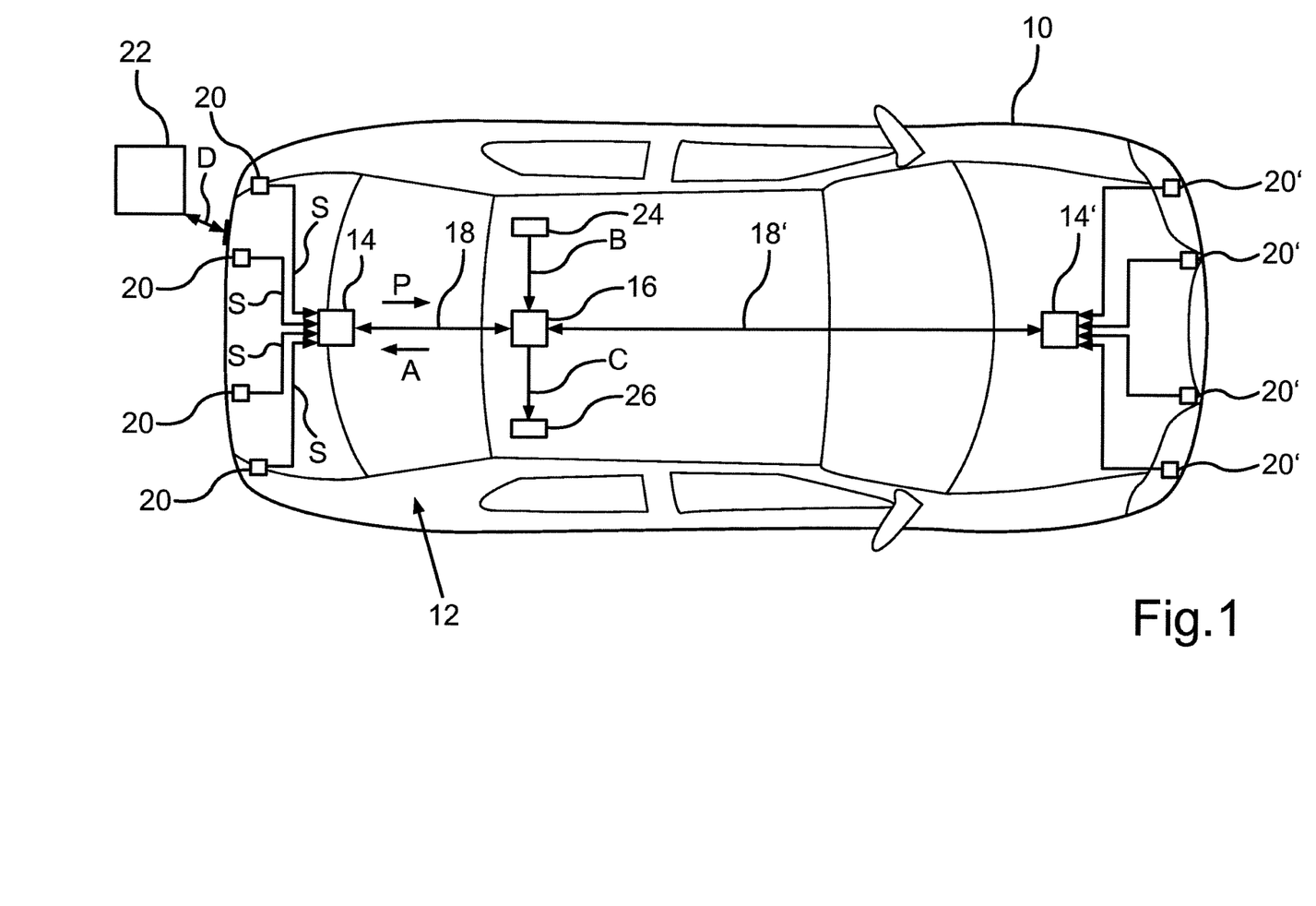
FIG. 1 shows a schematic representation of a plan view of an embodiment of the motor vehicle according to the invention.

FIG. 1 shows a motor vehicle 10, which may be a car, particularly a passenger car, for example. The motor vehicle 10 may have a parking assistance apparatus or a parking assistance system or parking assistance, for short, 12. The parking assistance 12 may have a first controller 14 (ECU—electronic control unit) and a second controller 16, which may be connected via a communication link 18, for example a CAN bus.

The first controller 14 may be designed to process raw sensor data S from sensors 20, particularly ultrasonic sensors, connected to the first controller 14 and, as a result, to take the raw sensor data S as a basis for producing position data P that describe, by way of example, a relative position, such as a distance D, for example, of the motor vehicle 10 from a vehicle-external object 22, for example a concrete post or a parked different vehicle. The first controller 14 can transmit the position data P to the second controller 16 via the communication link 18.

The second controller 16 may have control logic for a parking aid. To this end, the second controller 16 can also receive operating data B from a further data source 24 of the motor vehicle 10, for example another controller or a sensor, and take the operating data as a basis for performing an odometry measurement, for example, for the motor vehicle 10. In order to implement the parking aid functionality or parking assistance for a driver (not shown) of the motor vehicle 10, the controller 16 can control an actuator device 26 by producing a control signal C, for example digital control commands. The control signal C can be produced on the basis of the position data P and possibly the operating data B. The second controller 16 can also transmit an initiation signal A to the first controller 14 via the communication link 16 in order to initiate or prompt a measurement of the relative position in relation to the object 22.

The motor vehicle 10 may also have a third controller 14' and one or more further controllers (not shown), with further sensors 20' being able to be connected to the third controller 14' (and possibly further controllers) in order to capture a relative position in relation to a further vehicle-external object (not shown). The third controller 14' may be coupled to the second controller 16 via a further communication link 16'. For the sake of clarity, only the first controller 14 and the second controller 16 are discussed below, but not the possible further controllers 14'. The explanations apply to the third controller 14' in corresponding fashion.

The controllers 14, 16 perform particularly time synchronization via the communication link 18, that is to say particularly via a CAN bus. This is based particularly on the PTP or on a communication protocol that contains elements from the PTP, but with matching to a CAN bus having been performed. In particular, the bus transit time for the position data P via the communication link 18 is considered, and this achieves higher accuracy for the synchronization of time data that are used in the second controller 16.

The synchronization method is explained below with reference to FIG. 2 and FIG. 3.

Figure 2:
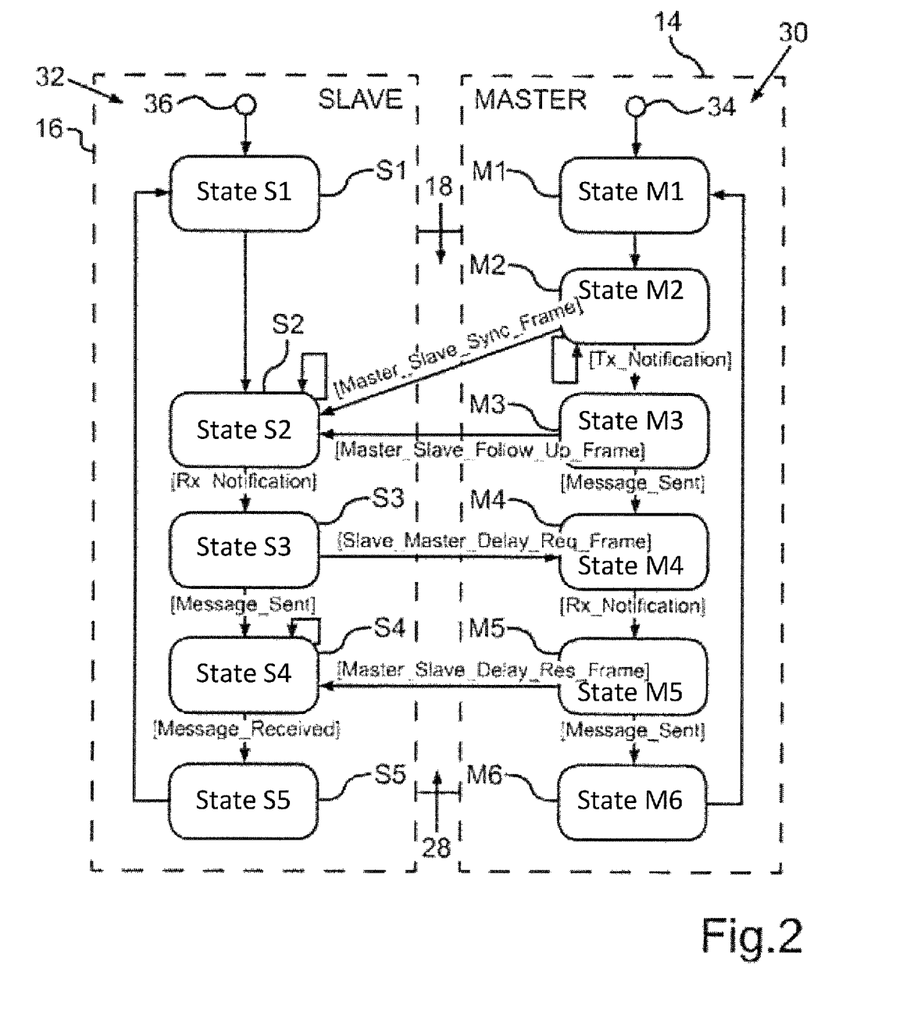
FIG. 2 shows a flowchart for an embodiment of the method according to the invention, as can be performed in the motor vehicle of FIG. 1.

FIG. 2 shows the first controller 14 and the second controller 16 and also the communication link 18 that the first controller 14 and the second controller 16 use to interchange synchronization data 28. In the first controller 14, a state machine or machine, for short, 30 having states M1, M2, M3, M4, M5, M6 is provided. In the second controller 16, a state machine or machine, for short, 32 having states S1, S2, S3, S4, S5 is provided. The two machines 30, 32 are used to produce a synchronization procedure in which the first controller 14 forms a master, which prescribes an absolute time statement, and the second controller 16 forms a slave, which takes on the time statement from the master. The machine 30 is initialized by an initialization routine 34 of the first controller 14, and the machine 32 is initialized by an initialization routine 36 of the second controller 16.

Figure 3:
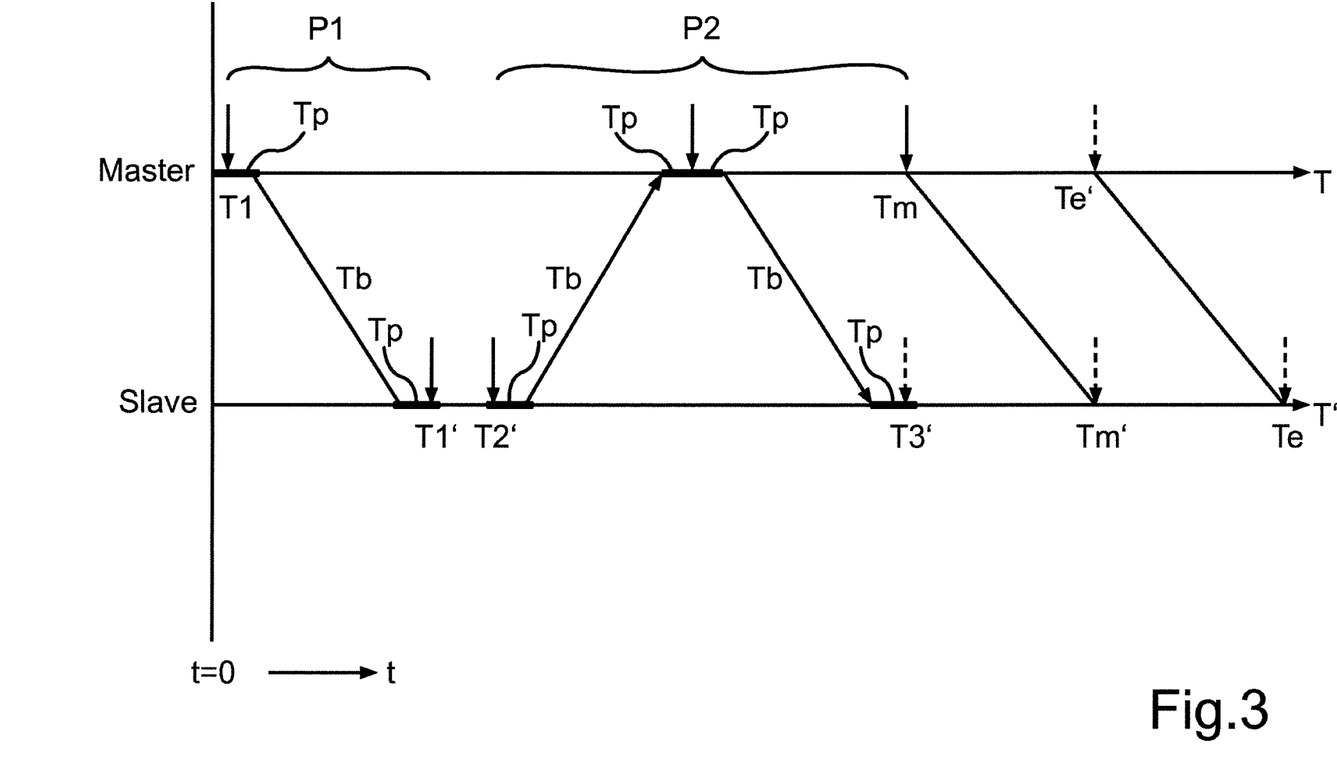
FIG. 3 shows a graph to illustrate an interchange of synchronization data, as can be performed by the method shown in FIG. 2.

For the explanations of the machines 30 and 32 that follow, reference is also made to FIG. 3, in which measurement times that are ascertained in order to ascertain a transmission time Tb that is needed for a data transmission via the communication link 18 are indicated along a time line for the time t, a processing time Tp for communication messages within the first controller 14 and the second controller 16 being taken into consideration. The transmission time Tb and the transmitter-end and receiver-end processing time Tp together form the transmission period Tdelay=2 Tp+Tb.

A system clock (not shown) of the master indicates the time t as system time T and a system clock (not shown) of the slave indicates the time t as system time T'. The synchronization of said system clocks is performed in two phases P1, P2, a first estimate of a time offset To between system clocks of the master and slave being ascertained in the first phase P1, the first estimation also including the transmission period Tdelay for the communication. Following conclusion of the synchronization phase, the transmission period Tdelay is ascertained in the second phase P2, and then a more accurate value for the time offset To is ascertained.

An initialization routine 34 puts the master into the state M1 in which it starts the synchronization. In the state M1, the master can monitor or control that a respective predetermined period elapses between two synchronization cycles, said period being able to be, by way of example, in a range from 0.5 second to 10 seconds, particularly 0.5 second to 2 seconds, for example being able to be 1 second. As soon as a synchronization cycle needs to be performed, the master changes to the state M2.

An initialization routine 36 puts the slave into the state S1, from where the slave automatically changes to the state S2 and awaits messages from the master. Further state transitions are controlled by event signals Rx_Notification, Message_Sent, Tx_Notification, Message_Received, which are initiated by transmission or reception processes.

In the first phase P1 of the synchronization cycle, the master sends a synchronization message Master_Slave_Sync_Frame to the slave and notes or stores the transmission time T1 of the synchronization message. The time measurement takes place as soon as the synchronization message is transmitted from the communication module, which is particularly a CAN driver, to the communication link 18. The slave receives the synchronization message, and this initiates time measurement for the reception time T1', which is stored in the slave.

After the master has transmitted the synchronization message, this is signalled as Tx_Notification, and the master changes to the state M3, where it transmits a measurement message Master_Slave_Follow_Up_Frame with the measured transmission time T1 as transmission data to the slave. This message is needed because it can provide an offset between the CAN transmission function and the exact transmission time of the CAN driver. The slave at the other end of the communication link 18 stores the received transmission time T1 of the master, which describes the exact transmission time of the synchronization message. This terminates the first phase and there are two time measurements available on the basis of which the time offset can be coarsely estimated, coarse estimation meaning that the still unknown transmission period Tdelay is also contained in the estimation. The time offset is obtained in accordance with the following formula:

$$To=T1-T1'.$$

Termination of the first phase prompts a change to the state M4 in the master and to the state S3 in the slave. In the second phase, the transmission period Tdelay is ascertained. To this end, the slave sends a request message Slave_Master_Delay_Req_Frame to the master and in so doing ascertains the transmission time T2', which is stored in the slave. The slave then changes from the state S3 to the state S4. The master receives the message and then responds with a response message Master_Slave_Delay_Res_Frame. To this end, the master changes from the state M4 to the state M5. In this case, a processing period that is as short as possible should be implemented in the master, this being able to be achieved particularly on the basis of interrupts.

The slave receives the response message and ascertains the reception time T3'. On the basis of the transmission time T2' and the reception time T3', the transmission period Tdelay can be ascertained in accordance with the following formula:

$$T\text{delay}=(T3'-T2')/2=2Tp+Tb.$$

The difference T3'−T2' is the round trip time Trrt.

The delays that arise can be divided into program-dependent software delays and circuit-dependent hardware delays. If the programs are implemented on the basis of interrupts, then the software delay can be consistently limited in a deterministically predictable time interval. It is particularly advantageous in this case if the first controller 14 and the second controller 16 have the same circuit design, so that the processing period Tp can be assumed to be identical in the first controller 14 and in the second controller 16. If different hardware is used, it is accordingly necessary for two different processing periods Tp and Tp' to be taken as a basis. For the resultant transmission period Tdelay, the result is then:

$$T\text{delay}=Tp'+Tp+Tb.$$

In the slave, there is now an estimate available for the transmission period Tdelay and the time offset To, by means of which the slave can convert a time statement that it receives from the master into a time statement that is oriented to the system clock of the slave. To this end, the slave could adjust a system clock as appropriate, for example.

Another concept that is suitable in this case, which is simpler to implement and is also suitable particularly for the use of further controllers, such as the third controller 14', is the conversion of time stamps that have been received from the master into virtual time stamps. In this regard, FIG. 3 illustrates how a time stamp Tm for a measurement time at which the master, namely the first controller 14, has evaluated the sensor signals S, that is to say has operated the sensors 20, can be converted at the slave end into a virtual time stamp Tm':

$$Tm' = \begin{cases} Tm - |To - Tdelay|, & To < 0 \\ Tm - |To + Tdelay|, & To \geq 0 \end{cases}$$

By using virtual time stamps, it is also possible to convert a time stamp Te for a time of execution of a particular routine in the slave for the master into a virtual time stamp Te'.

The exact alignment of time stamps that are processed in the two controllers 14, 16 and also further controllers allows networking of an individual master to multiple slaves to be implemented in a very simple and reliable manner. Each slave can perform the two simulation phases P1 and P2 with the single master, and it then has the necessary time measurements available in order to virtualize time stamps.

The text below describes how the processing period Tp can be set to a small value for the parking assistance system 10. In controllers such as the first controller 14 and the second controller 16, there is normally the problem that the actual user software is in place on one or more layers of operating software, as illustrated in FIG. 4.

Figure 4:
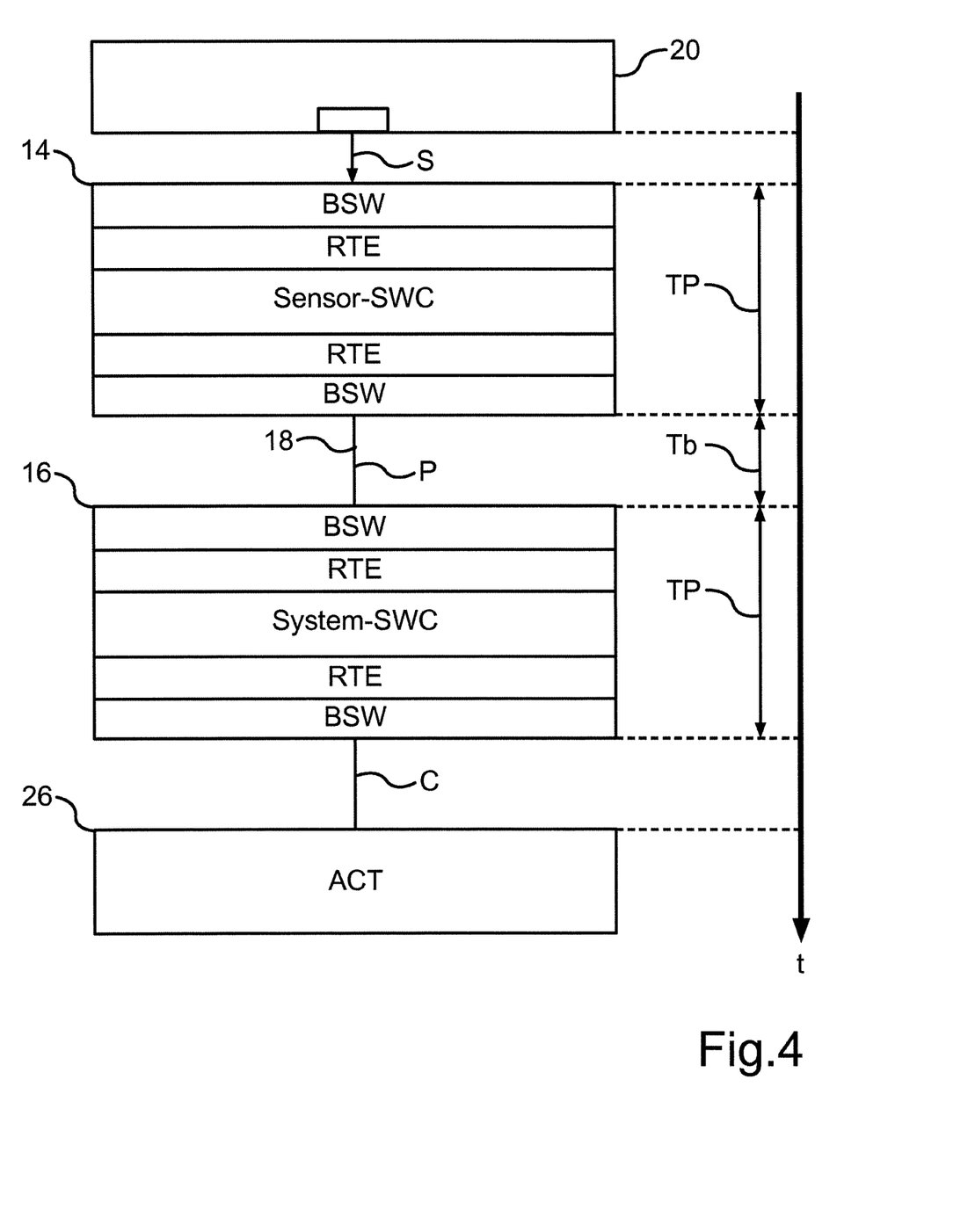
FIG. 4 shows a schematic representation of a parking assistance apparatus, as may be installed in the motor vehicle of FIG. 1.

FIG. 4 shows that the first controller 14 receives the sensor signals S from the sensors 20 and that the received sensor signals need to be transmitted first through a layer of a piece of basic software BSW and then through a layer of a runtime environment RTE before the actual sensor software (sensor SWC) can process the sensor signals S and can compute the position data P therefrom. To transmit the position data P, the sensor software needs to pass or transmit the computed position data through the RTE layer and the BSW layer to the driver of the communication module for transmission via the communication link 18.

On the whole, this can result in a processing period TP that is much longer than the desired processing period Tp.

Accordingly, it is also true in the second controller 16 that the received position data P need to be channeled through a piece of basic software BSW and a runtime environment RTE to the actual control logic (system SWC) in order to provide the parking assistance. The control commands for the actuator device ACT 26 that are computed on the basis of the position data P likewise need to be passed through the RTE layer and the BSW layer to the driver of a communication network again by the control logic. In this case too, the result is again a processing period TP that is much longer than the desired processing period Tp.

So as now to process the synchronization data 28 in a processing period Tp that is as short as possible within the first controller 16 and the second controller 18, a respective interrupt routine can be provided. This is described within the context of a CAN bus controller in FIG. 5.

Figure 5:
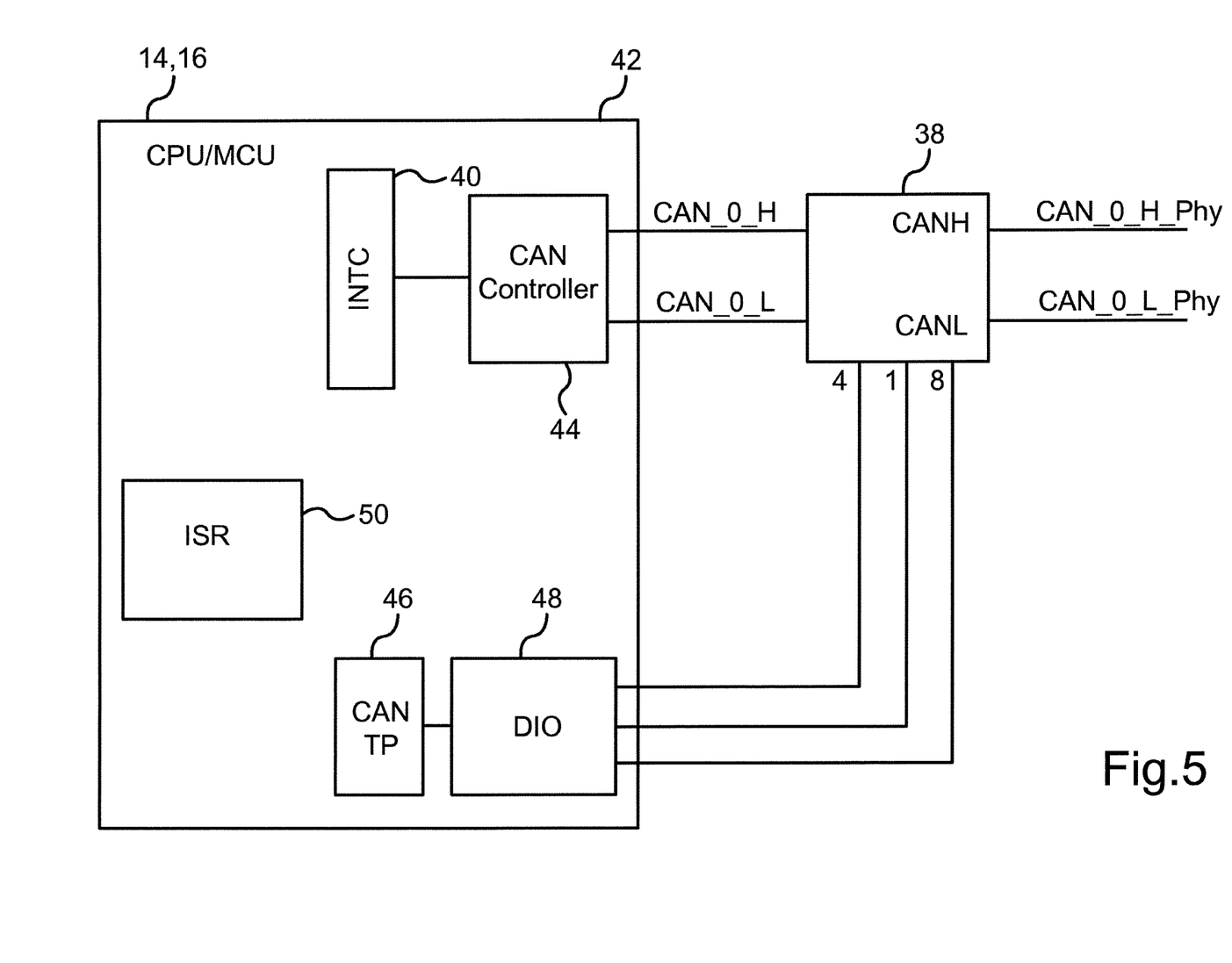
FIG. 5 shows a processor device of a controller, as may be part of the parking assistance apparatus of FIG. 4.

FIG. 5 shows how, for the controllers 14, 16, signals from a transceiver 30 can be taken as a basis for controlling an interrupt controller INTC 32 on a board 34 of one of the controllers 14, 16. By way of example, the board 34 may have the central processor, that is to say the CPU, or the microcontroller control unit MCU of the controller 14, 16. The interrupt controller 32 may be coupled to the bus driver CAN controller 36, which is coupled to the transmission lines CAN_0_H and CAN_0_L of the transceiver 30. The PIN assignment shown in FIG. 5 for the transceiver 30 corresponds to that of the known transceiver circuit TJA1042.

To transmit the synchronization data, a protocol controller 38 interchanges the CAN transport protocol CAN-TP with the transceiver 30 by means of a digital input/output DIO 40 via the represented PINs. This can involve the transmission and reception times being identified, which in turn initiates the start of an interrupt service routine ISR, which may be stored in a memory 42 of the circuit 34, on the interrupt controller 32. The interrupt service routine ISR may be designed to store its respective initiation time, which means that the described times T1, T1', T2' and T3' can then be ascertained.

On the whole, the example shows how the precision time protocol (PTP) can be used to provide time synchronization via a CAN bus.

The invention claimed is:

1. A parking assistance apparatus for a motor vehicle, comprising:
at least one sensor that produces a sensor signal that is dependent on a relative position of a vehicle-external object;
a first controller operatively connected to the at least one sensor and comprising a first communication hardware, wherein the first controller:
receives the sensor signal from the at least one sensor, wherein each sensor signal is a basis for producing position data that describe the relative position of the vehicle-external object, and
outputs the position data via a communication link of the motor vehicle; and
a second controller comprising a second communication hardware, wherein the second controller:
receives the position data from the first controller via the communication link,
during a parking maneuver of the motor vehicle, produces, based on the position data, a control signal that controls an actuator device of the motor vehicle, and
outputs the control signal to the actuator device,
wherein the first controller and the second controller comprise identical communication hardware for providing the communication link, and
wherein a first processing time of the first controller is identical to a second processing time of the second controller for a same communication operation.

2. The parking assistance apparatus according to claim 1, wherein the first controller transmits, for each relative position, a time stamp, which indicates a time of capture of the relative position, to the second controller via the communication link.

3. The parking assistance apparatus according to claim 1, wherein the second controller is configured
a) to receive a sensor signal directly from at least one further sensor connected directly to the second controller and to produce further position data therefrom for producing the control signal, and/or
b) to use operating data of the motor vehicle to ascertain additional motion data of the motor vehicle comprising odometry data.

4. The parking assistance apparatus according to claim 1, wherein a synchronization device is provided that at least one of ascertains a time offset between a system clock of the first controller and a system clock of the second controller and ascertains a transmission period for a transmission of the position data via the communication link.

5. The parking assistance apparatus according to claim 4, wherein at least one of the first and second controller has a respective interrupt routine that ascertains the time offset and/or the transmission period.

6. The parking assistance apparatus according to claim 4, wherein the first and second controllers use the communication link to communicate in accordance with a precision time protocol.

7. The parking assistance apparatus according to claim 1, wherein the communication link comprises a controller area network bus and/or a FlexRay bus.

8. The parking assistance apparatus according to claim 1, wherein the second controller uses the communication link to transmit at least one initiation command for initiating a measurement of the relative position to the first controller.

9. The parking assistance apparatus according to claim 1, wherein the actuator device comprises at least one of a tone generator for producing a signal tone and a display device for presenting an object distance of the vehicle-external object and a steering device for semi-automatic parking and a steering device for parking space exit and a brake controller for emergency braking when there is a risk of collision and a parking space identifier and parking space surveyor and a parking controller that performs an autonomous parking maneuver.

10. A motor vehicle having at least one parking assistance apparatus wherein the at least one parking assistance apparatus comprises:
   at least one sensor that produces a sensor signal that is dependent on a relative position of a vehicle-external object;
   a first controller operatively connected to the at least one sensor and comprising a first communication hardware, wherein the first controller:
      receives the sensor signal from the at least one sensor, wherein each sensor signal is a basis for producing position data that describe the relative position of the vehicle-external object, and
      outputs the position data via a communication link of the motor vehicle; and
   a second controller comprising a second communication hardware, wherein the second controller:
      receives the position data from the first controller via the communication link,
      during a parking maneuver of the motor vehicle, produces, based on the position data, a control signal that controls an actuator device of the motor vehicle, and
      outputs the control signal to the actuator device,
   wherein the first controller and the second controller comprise identical communication hardware for providing the communication link, and
   wherein a first processing time of the first controller is identical to a second processing time of the second controller for a same communication operation.

11. A method for operating a parking assistance apparatus, wherein the parking assistance apparatus comprises:
   at least one sensor that produces a sensor signal that is dependent on a relative position of a vehicle-external object;
   a first controller operatively connected to the at least one sensor and comprising a first communication hardware, wherein the first controller:
      receives the sensor signal from the at least one sensor, wherein each sensor signal is a basis for producing position data that describe the relative position of the vehicle-external object, and
      outputs the position data via a communication link of the motor vehicle; and
   a second controller comprising a second communication hardware, wherein the second controller:
      receives the position data from the first controller via the communication link,
      during a parking maneuver of the motor vehicle, produces, based on the position data, a control signal that controls an actuator device of the motor vehicle, and
      outputs the control signal to the actuator device,
   wherein a parking maneuver in which the motor vehicle is parked or taken out of a parking space comprises:
      the at least one sensor of the parking assistance apparatus producing a respective sensor signal that is dependent on the relative position of the vehicle-external object;
      the first controller of the parking assistance apparatus receiving from the at least one sensor the respective sensor signal thereof and taking each sensor signal as a basis for producing position data and outputting the position data via the communication link of the motor vehicle; and
      the second controller of the parking assistance apparatus receiving the position data via the communication link and producing, on the basis of the position data, the control signal that controls the actuator device of the motor vehicle, and outputting the control signal to the actuator device,
   wherein the first controller and the second controller comprise identical communication hardware for providing the communication link, and
   wherein a first processing time of the first controller is identical to a second processing time of the second controller for a same communication operation.

12. The method according to claim 11, wherein the first controller and the second controller exchange synchronization data via the communication link once or repeatedly or periodically, and the synchronization data are used to ascertain at least one of a time offset between system clocks of the first and second controllers and a transmission period for the transmission of position data.

13. The method according to claim 12, wherein the transmission period is ascertained by measuring a round trip time and estimating the transmission period as half the round trip time, and the time offset is ascertained by
   the first controller transmitting a synchronization message and measuring a transmission time and then transmitting a measurement message with the transmission time, and
   the second controller, receiving the synchronization message and in so doing measuring a reception time and then receiving the measurement message and ascertaining the time offset by taking into consideration the transmission time, the reception time and the transmission period.

14. The method according to claim 12, wherein the first controller transmits at least one time stamp, which indicates a time of capture of the relative position of the vehicle-external object, to the second controller via the communication link, and the second controller takes the time stamp and the time offset and/or the transmission period as a basis for computing a virtual time stamp.

* * * * *